United States Patent [19]

Berkhout et al.

[11] Patent Number: 4,884,188

[45] Date of Patent: Nov. 28, 1989

[54] MAGNETIC ROLLER MEANS WITH STATIONARY MAGNETIC KNIFE BLADE FOR USE IN PRINTING DEVICES

[75] Inventors: Ronald Berkhout, Venlo; Johannes G. V. Van Stiphout, Maasbree; Jozef A .W. M. Corver, Nuenen; Antoon L. Hoep, Molenhoek; Berend J. Knapen, Baarlo, all of Netherlands

[73] Assignee: Oce-Nederland B.V., Venlo, Netherlands

[21] Appl. No.: 235,428

[22] Filed: Aug. 23, 1988

[30] Foreign Application Priority Data

Aug. 25, 1987 [NL] Netherlands ........................ 8701985
May 20, 1988 [NL] Netherlands ........................ 8801309

[51] Int. Cl.[4] .............................................. G01D 15/00
[52] U.S. Cl. ............................... 346/160.1; 346/153.1
[58] Field of Search ................ 346/160.1, 153.1, 74.2; 355/300, 15

[56] References Cited

U.S. PATENT DOCUMENTS 4,763,143 8/1988 Ohbu et al. ..................... 346/160.1
4,777,494 10/1988 Okuna et al. .................... 346/160.1

*Primary Examiner*—Arthur G. Evans

[57] ABSTRACT

A printing device for reproducing information having movable image-forming element with a dielectric surface. An image-forming station is provided in which a magnetic roller having a rotatable electrically conductive non-magnetic sleeve is disposed near the surface of the image-forming element. An electric field between the image-forming element and the magnetic roller is generated in accordance with an information pattern. An electrically conductive magnetically attractable toner powder is placed in the zone between the magnetic roller and the image-forming element during generating of the electric field. A magnetic field formed in the zone by stationary ferromagnetic knife blade disposed inside the magnetic roller sleeve and the blade is held between like poles of two magnets at an angle of between 70°. and 85° to the tangential plane to the sleeve.

7 Claims, 3 Drawing Sheets

MAGNETIC ROLLER MEANS WITH STATIONARY MAGNETIC KNIFE BLADE FOR USE IN PRINTING DEVICES

FIELD OF THE INVENTION

The present invention relates to a novel knife means positioned within a magnetic roller, and, in particular, to a ferromagnetic knife blade stationarily positioned between two magnets within the magnetic roller.

BACKGROUND OF THE INVENTION

The present invention relates to a printing device for reproducing information comprising a movable image-forming element having a dielectric surface and an image-forming station in which a magnetic roller with a rotatable electrically conductive non-magnetic sleeve is disposed near the surface of the image-forming element. Means are provided to generate an electric field between the image-forming element and the magnetic roller in accordance with an information pattern. An electrically conductive magnetically attractable toner powder is presented into the zone between the magnetic roller and the image-forming element.

It is known to generate a magnetic field in that zone by using a stationary ferromagnetic knife blade disposed inside the sleeve of the magnetic roller and held between like poles of two magnets.

For example, in European Patent Application No. 191 521, a toner brush formed at the knife blade between the magnetic roller and the image-forming element is described which is not of a constant shape, but continuously varies to some extent. The small variations in the brush shape are caused by variations in the toner power forming the brush, e.g., variations in particle size, particle size distribution and magnetic properties of the toner particles, and variations in the density (quantity) of toner powder in the toner brush. The changes of shape of the toner brush result in changes of shape and location of the toner brush boundary line as seen from the side where the image-forming element leaves the toner brush. Consequently, image faults occur during the image-forming process due to the fact that toner particles are not deposited in the correct place on the image-forming element.

Other types of magnetic developer brushes have been proposed, see for example, U.S. Pat. No. 4,354,454 wherein a brush having a plurality of magnetic portions is described. In Japanese Application No. 59-224369 a device for developing electric charges on stripe electrodes of an electrode drum is shown. This device has the same type of problem associated with device described in European Application No. 191 521.

Accordingly, it is an objective of the present invention to provide a printing device which overcomes image faults described above.

SUMMARY OF THE INVENTION

Generally, the present inventions provides the knife blade at an angle of between 70° to 85° to the tangential plane of the sleeve of the magnetic roller. It has been unexpectedly found that the magnetic field created in the zone between the magnetic roller and the image-forming element is such that despite variations in the toner composition and density a stable toner brush is obtained. A very stable toner brush is obtained if the angle is between 72.5° and 77.5°.

In a preferred embodiment, the magnets between which the knife blade is held are located in a mutually offset relationship against the knife blade. The magnet situated in front of the knife blade (as considered from the side where the image-forming element leaves the image-forming station) is preferably positioned further from the knife blade end than the other magnet.

In another embodiment of the invention, the magnets are formed by permanent magnets having a magnetic induction greater than or equal to 0.30 T measured at the center-point of the surface of each magnet which is directed towards the knife blade. As a result, a strong magnetic field is created in the zone between the magnetic roller and the image-forming element, so that even if there is toner powder with a relatively small quantity of magnetic pigment in this zone a stable toner brush is obtained.

In a further embodiment of the invention, a ferromagnetic plate is disposed against that side of each of the magnets which is remote from the knife blade. This plate preferably has a thickness of between 0.5 and 2 mm. As a result of the plate, the magnetic field is focused more precisely towards the image-forming element to provide an extremely stable toner brush.

In another embodiment of the invention a third stationary magnet is positioned just in front of the magnet fixed against the knife blade (as considered from the side where the image-forming element enters the image-forming station. The third magnet is preferable disposed near the sleeve of the magnetic roller.

In this embodiment, an angle of between 78.5° and 83.5° is preferably included by the plane of the knife blade and the tangential plane to the sleeve of the magnetic roller. This gives an even more optimal form of the magnetic field. Also, the discharge of surplus toner from the toner brush back in the direction of that side where the image-forming element enters the image-forming station is substantially enhanced in this embodiment. This is achieved by the third magnet, which ensures that the magnetic field is effective over a greater part of the sleeve of the magnetic roller at the entry-side of the image-forming station.

Other advantages of the invention will become apparent from a perusal of the following detailed description of the presently preferred embodiments taken in connection with the accompanying drawings.

PRESENTLY PREFERRED EMBODIMENT

Figure 1:
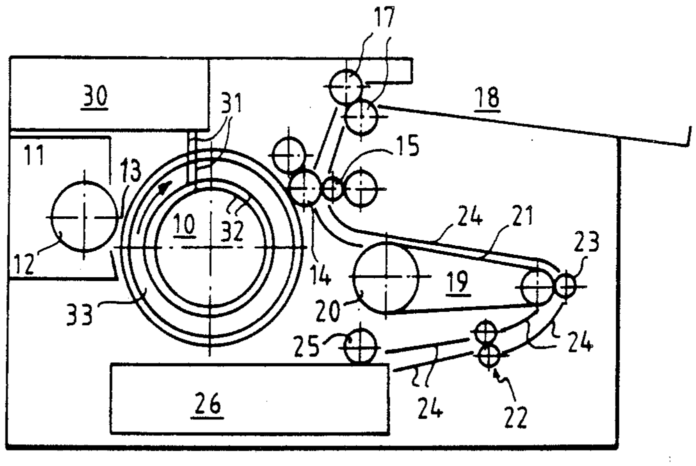
FIG. 1 is a diagrammatic presentation of an electrostatic printing device.

Referring to FIG. 1, an electrostatic printing device having an image-forming element in the form of a rotating drum 10 is shown. Drum 10 is provided with an electrostatic layer build up from a number of controllable electrodes in and beneath a dielectric layer.

At a short distance from the surface of the image-forming element 10 a magnetic roller 12 is disposed in an image-forming station 11 and comprises a rotatable electrically conductive non-magnetic sleeve and an internal stationary magnet system. The rotatable sleeve of magnetic roller 12 is covered with a uniform layer of electrically conductive and magnetically attractable toner powder, which toner powder is in contact with the image-forming element 10 in image-forming zone 13.

By the application of a voltage between magnetic roller 12 and one or more of the selectively controllable electrodes of image-forming element 10, a powder image is formed on the image-forming element 10. This powder image is transferred, for example, by the application of pressure to a heated rubber-covered roller 14.

From stock pile 26 a sheet of paper is taken off by roller 25 and this sheet is fed via guide tracks 24 and rollers 22 and 23 to a heating station 19. Heating station 19 comprises belt 21 trained about a heated roller 20. The paper sheet is heated by contact with the belt 21. The sheet of paper heated in this way is now passed between the rollers 14 and 15, the softened powder image present on the roller 14 being completely transferred to the sheet of paper. The temperatures of the belt 21 and the roller 14 are so adapted to one another that the image fuses to the sheet of paper. The sheet of paper provided with an image is fed via the conveyor rollers 17 to a collecting tray 18. Unit 30 comprises an electronic circuit which converts the optical information of an original into electrical signals which are fed to controllable electrodes (not shown in detail) via wires 31 provided with sliding contacts and conductive tracks 32 disposed in the insulating side wall of image-forming element 10.

Figure 2:
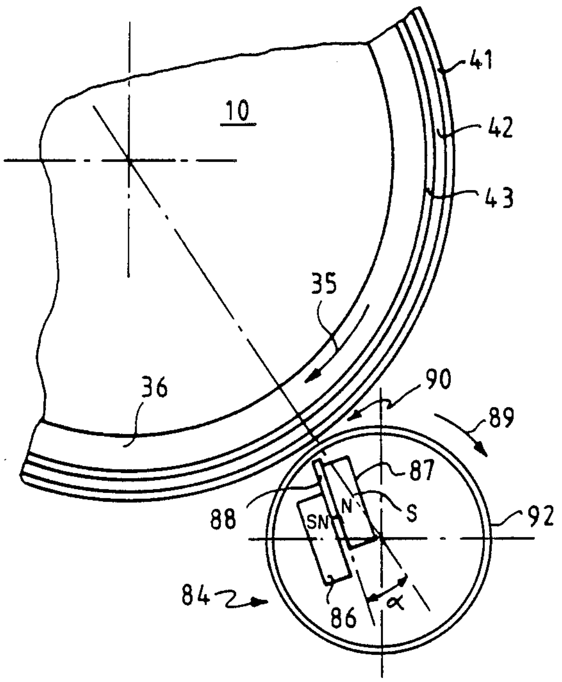
FIG. 2 is a cross-section of one embodiment of a printing device according to the invention.

With respect to FIG. 2, a cross-section is shown through image-forming element 10 in the form of a drum 36 rotatable in the direction of arrow 35 and provided with an insulating layer 43 on which there is disposed a large number of adjacent mutually insulated electrodes 42 extending endlessly in the direction of movement of the drum and covered by a dielectric layer 41. Developing device 84 comprises a grounded sleeve 92 rotatable in the direction of arrow 89 about a ferromagnetic knife blade 88 held between two magnets 86 and 87.

The thickness of the ferromagnetic knife blade 88 is at least 0.4 mm in order to produce an optimal magnetic flux in the material. However, a maximum thickness of about 4 mm is used for constructional reasons. Magnets 86 and 87, which are in contact with the knife blade 88 by like poles, generate a narrow magnetic field in the image-forming zone 90, this field emerging from the end of knife blade 88 which is situated a short distance from the sleeve 92. By means of a feed device (not shown in detail but well known to those skilled in the art), e.g., a magnetic brush—a uniform layer of conductive magnetic toner is applied to the dielectric layer 41. This feed takes place in that part of the periphery of image-forming element 10 which, as considered in the direction of motion, is situated in front of image forming zone 90. As a result, toner powder is conveyed via element 10 to image-forming zone 90 in order to form a very narrow toner brush under the influence of the directed magnetic field.

In order to obtain the sharpest possible toner brush, the strongest possible magnetic field is required, having a large magnetic gradient at least on that side where image-forming element 10 leaves image-forming zone 90. To this end, the assembly comprising knife blade 88 and magnets 86 and 87 is disposed at an angle $\alpha$ with respect to the line connecting the centers of drum 36 and sleeve 92. Angle $\alpha$ is between 5° and 20°, preferably between 12.5° and 17.5°.

To achieve an even sharper toner brush, it is preferable to dispose magnets 86 and 87 in a mutually offset relationship against knife blade 88. Preferably, magnet 87 is positioned more closely to the end of knife blade 88 than is magnet 86.

Further, it has been found that a very strong magnetic field is obtained, even using toners with weak magnetic properties, by using for the magnets 86 and 87 permanent magnets with a magnetic induction B greater than or equal to 0.30 T. The value of this magnetic induction is measured via a Hall-probe of the type SAB1-1802 with a Gauss-meter model 615 of FW Bell Inc. on a magnet having a length of 310 mm, a width of 15 mm and a thickness of 6 mm, at the center-point of the surface with which that magnet is fixed against the knife blade 88. A material which satisfied this requirement for a suitable magnet is a neodynium-iron-boron alloy.

Figure 3:
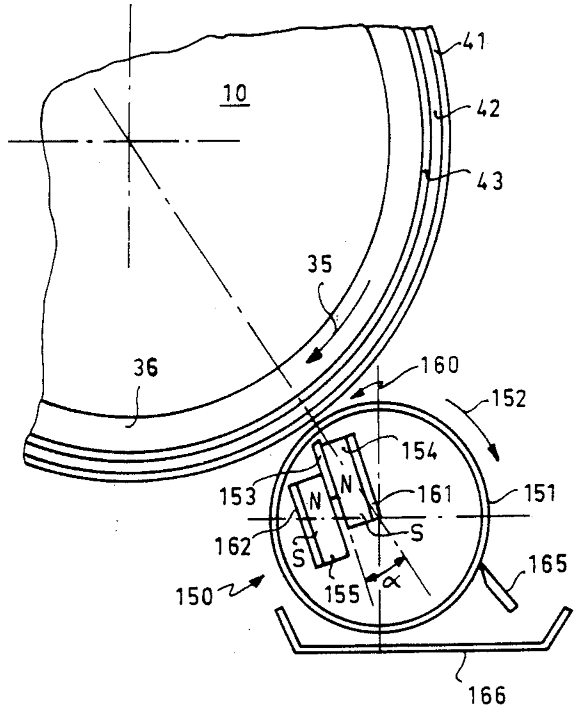
FIG. 3 is a cross-section of another embodiment of a printing device according to the invention.

FIG. 3 shows a second embodiment of the printing device according to the invention in which image forming element 10 having an identical structure to tat described with respect to FIG. 2 cooperates with a developing device 150. Developing device 150 comprises a grounded sleeve 151 which is rotatable in the direction of arrow 152 about a ferromagnetic knife blade 153 held between magnets 154 and 155. Magnets 154 and 155, which are in contact with the knife blade 153 by like poles, generate a narrow magnetic field in the image-forming zone 160 and emerge from the end of the knife blade 153 which is situated at a short distance from the sleeve 151. Just as described with respect to the device shown in FIG. 2, a feed device (not shown in detail) applies a uniform layer of conductive magnetic toner to the dielectric layer 41. This feed takes place in the direction of movement of the image-forming element 10 in front of the image-forming zone 160. As a result, toner powder is conveyed via element 10 to the image-forming zone 160 to form a vary narrow toner brush under the influence of the directed magnetic field in this zone.

In this embodiment, ferromagnetic plates 161 and 162 are fixed against the magnets 154 and 155, respectively, on either side of the magnet system. Preferably, the plates have a thickness of between 0.5 and 2 mm. For the remainder the magnet system of this embodiment is identical to the magnet system as described with respect to FIG. 2. The use of the ferromagnetic plats 161 and 162 provides less disturbance to the magnetic gradient in image-forming zone 160. The excess toner is entrained by the sleeve 151 and removed therefrom by a stripper 165, for example, and collected in a tray 166.

Figure 4:
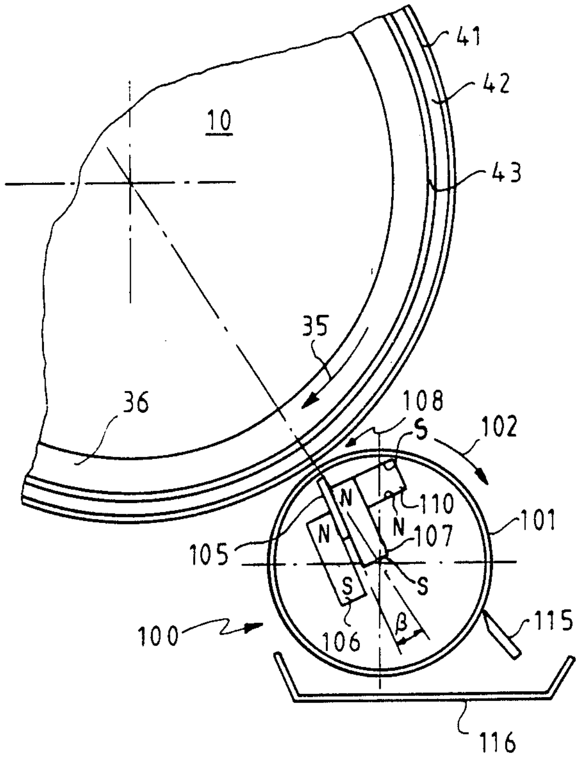
FIG. 4 is a cross-section of another embodiment of a printing device according to the invention.

FIG. 4 shows a third embodiment of the printing device according to the invention in which an image-forming element 10 of identical structure to that described with respect to FIG. 2 cooperates with a developing device 100. This developing device 100 comprises a grounded sleeve 101 which is rotatable in the direction of arrow 102 about a ferromagnetic knife blade 105 held between magnets 106 and 107. The magnets 106 and 107, which are in contact with the knife blade 105 by like poles generate a narrow magnetic field in the image-forming zone 108, emerging from the end of the knife blade 105 which is situated at a short distance from the sleeve 101. Just as described with respect to FIG. 2 a feed device (not shown in detail) applies a uniform layer of conductive magnetic toner to the dielectric layer 41. This feed takes place in the direction of movement of image-forming element 10 in front of image-forming zone 108. As a result, toner powder is conveyed via element 10 to image-forming zone 108 to form a very narrow toner brush under the influence of the directed magnetic field in this zone.

In this embodiment, a third magnet 110 is preferably added to the magnet system of the developing device 100. In addition, the complete magnet system is placed at an angle $\beta$ with respect to the line connecting the centers of the drum 36 and the sleeve 101, said angle being between 6.5° and 11.5°.

Addition of magnet 110 to the magnet system 105, 106 and 107 reinforces the narrow and strong magnetic field in the image-forming zone 108. Consequently, the sharpest possible toner brush is formed on the exit side. On the entry side, supplementary magnet 110 ensures that the magnetic field is effective over a greater part of the magnetic roller sleeve surface, so that surplus toner powder is more efficiently carried off from the image-forming zone 108 by the sleeve 101. The surplus toner is driven by the surface of sleeve 101 and can be stripped from this, for example, by a stripper 115, and collected in a tray 116.

In addition and similarly to the arrangement in the first embodiment of the invention, an arrangement is chosen in which magnets 106 and 107 are disposed in offset relationship against the knife blade 105, with magnet 107 much closer to the knife blade end than magnet 106. This also contributes to forming a sharp toner brush.

While presently preferred embodiments of the invention have been shown and described in particularity, the invention may be otherwise embodied within the scope of the appended claims.

What is claimed is:

1. A printing device for reproducing information, comprising a movable image-forming element with a dielectric surface; an image-forming station including a magnetic roller having a rotatable electrically conductive non-magnetic sleeve disposed near the surface of said image-forming element; means to generate an electric field between the image-forming element and said magnetic roller in accordance with an information pattern; means for placing an electrically conductive magnetically attractable toner powder in the between said magnetic roller and said image-forming element; and means for generating a magnetic field in said zone comprising a stationary ferromagnetic knife blade disposed within said sleeve of said magnetic roller, said blade being held in place at an angle of between 70° and 85° to a tangential plane of said sleeve by two magnets.

2. A printing device according to claim 1, wherein said magnets are disposed in mutually offset relationship against the knife blade such that said magnet situated in front of the knife blade as considered from the side where said image-forming element leaves said image-forming station is further away from the knife blade end than said other magnet.

3. A printing device according to claims 1 or 2, wherein said angle is between 72.5° and 77.5°.

4. A printing device according to claims 1 or 2, wherein said magnets are formed by permanent magnets having a magnetic induction greater than or equal to 0.30 T measured at the respective center-point of each magnet.

5. A printing device according to claims 1 or 2, wherein a ferromagnetic plate is disposed against the side of each of said magnets which is remote from the knife blade, each of said plates having a thickness of between 0.5 and 2 mm.

6. A printing device according to claims 1 or 2, wherein a third magnet is disposed in front of said first magnet against said knife blade, said third magnet being disposed near said sleeve of the magnetic roller on the side were said image-forming element enters the image-forming station.

7. A printing device according to claim 6, wherein the angle between the plane of said knife blade and the tangential plane of the sleeve of the magnetic roller is between 78.5° and 83.5°.

* * * * *